US009317953B2

(12) United States Patent
Gaude et al.

(10) Patent No.: US 9,317,953 B2
(45) Date of Patent: Apr. 19, 2016

(54) COORDINATED 2-DIMENSIONAL AND 3-DIMENSIONAL GRAPHICS PROCESSING

(75) Inventors: Nicolas Gaude, Issy les Moulineaux (FR); Alex Ruelle, Colombes (FR); Mohamed Yahyaoui, Paris (FR); Fabien Andrieux, Combs la Ville (FR); Julien Marichez, Paris (FR); Fabien Lengronne, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 440 days.

(21) Appl. No.: 13/978,332
(22) PCT Filed: Oct. 3, 2011
(86) PCT No.: PCT/IB2011/054325
§ 371 (c)(1), (2), (4) Date: Jul. 15, 2013
(87) PCT Pub. No.: WO2012/093296
PCT Pub. Date: Jul. 12, 2012

(65) Prior Publication Data
US 2013/0293537 A1    Nov. 7, 2013

Related U.S. Application Data

(60) Provisional application No. 61/460,574, filed on Jan. 5, 2011.

(51) Int. Cl.
G06T 13/00    (2011.01)
G06T 15/00    (2011.01)
(Continued)

(52) U.S. Cl.
CPC ............. *G06T 13/20* (2013.01); *A63F 13/10* (2013.01); *G06T 13/00* (2013.01); *G06T 13/40* (2013.01);
(Continued)

(58) Field of Classification Search
CPC ......... G06T 13/40; G06T 13/00; G06T 13/80; G06T 13/20; G06T 19/00; G06T 17/20; G06T 17/00; G06T 15/10; G06T 15/00; A63F 13/10
See application file for complete search history.

(56) References Cited

U.S. PATENT DOCUMENTS 5,238,345 A *  8/1993 D'Andrea .............. B42D 15/00
                                                   281/15.1
6,570,555 B1 *  5/2003 Prevost ................... G06F 3/038
                                                   345/156

(Continued)

OTHER PUBLICATIONS

Jan. 13, 2012 Transmission of International Search Report and Written Opinion of International Searching Authority for the captioned application.

(Continued)

*Primary Examiner* — Abderrahim Merouan
(74) *Attorney, Agent, or Firm* — Hahn Loeser & Parks LLP (57) ABSTRACT

A data processing system (70) for graphics processing, including a scene manager (80). The scene manager (80) includes a scene loader (86) for receiving a description of 3 dimensional objects in a scene from a 3-dimensional modelling tool (46). The description includes first 2-dimensional frame data. The scene manager (80) has a texture image modification unit (84) for receiving second 2-dimensional frame data from a 2-dimensional rendering engine (40), and for replacing the first frame data by the second frame data. The scene manager (80) has an animation scheduler for scheduling and monitoring an animation of the scene. The system includes a display manager (96) operative to invoke the scene manager (80) to render output frames in a display buffer (100), and a scene Tenderer (88) configured for applying the 2-dimensional frame data to the 3-dimensional objects to produce textured 3-dimensional objects in the display buffer (100) and outputting the textured objects in the animation. Related apparatus and methods are also described.

15 Claims, 10 Drawing Sheets

(51) Int. Cl.
*G06T 13/20* (2011.01)
*G06T 17/20* (2006.01)
*G06T 13/40* (2011.01)
*G06T 13/80* (2011.01)
*A63F 13/40* (2014.01)
*G06T 17/00* (2006.01)
*G06T 15/10* (2011.01)
*G06T 19/00* (2011.01)

(52) U.S. Cl.
CPC ............... *G06T 13/80* (2013.01); *G06T 15/00* (2013.01); *G06T 15/10* (2013.01); *G06T 17/00* (2013.01); *G06T 17/20* (2013.01); *G06T 19/00* (2013.01)

(56) References Cited

U.S. PATENT DOCUMENTS

| | | | | |
|---|---|---|---|---|
| 6,597,358 | B2* | 7/2003 | Miller | G06F 3/04815 345/427 |
| 6,628,279 | B1* | 9/2003 | Schell | G06F 3/04845 345/420 |
| 7,450,124 | B2* | 11/2008 | Burch | G06T 13/00 345/427 |
| 7,586,495 | B2* | 9/2009 | Surti | G06T 15/40 345/422 |
| 2003/0142136 | A1* | 7/2003 | Carter | G06F 3/04815 715/782 |
| 2004/0095357 | A1* | 5/2004 | Oh | G06T 15/205 345/589 |
| 2007/0058933 | A1* | 3/2007 | Kobayashi | H04N 21/23614 386/248 |
| 2007/0156540 | A1* | 7/2007 | Koren | G06Q 10/087 705/14.51 |
| 2008/0024484 | A1* | 1/2008 | Naimark | G06T 7/0028 345/419 |
| 2008/0165210 | A1* | 7/2008 | Platzer | G06F 3/0485 345/672 |
| 2008/0168478 | A1* | 7/2008 | Platzer | G06F 3/04845 719/328 |
| 2008/0198168 | A1 | 8/2008 | Jiao et al. | |
| 2009/0141966 | A1* | 6/2009 | Chen | G06T 7/0028 382/154 |
| 2009/0160866 | A1* | 6/2009 | Pau | G06T 9/001 345/503 |
| 2012/0174124 | A1* | 7/2012 | Ward | G06F 8/71 719/331 |
| 2013/0300740 | A1* | 11/2013 | Snyder | G06F 3/016 345/420 |
| 2014/0125654 | A1* | 5/2014 | Oh | G06T 17/05 345/419 |

OTHER PUBLICATIONS

Bern Deknuydt et al., "Coding Of Dynamic Texture For Mapping On 3-D Scenes," *IEEE TransactionsOn Circuits And Systems For Video Technology*, vol. 9, No. 2, pp. 210-217 (Mar. 1999).

Sun-Uk Hwang et al., "Immersive Virtual Custom-Made Model House," Transactions of the Society of CAD/CAM Engineers, vol. 13, No. 2, pp. 8-17 (Feb. 2008).

"Immersive Virtual Custom-Made Model House," Youtube (Sep. 10, 2008, retrieved from the internet on Jan. 5, 2012).

* cited by examiner

COORDINATED 2-DIMENSIONAL AND 3-DIMENSIONAL GRAPHICS PROCESSING

The present application is a §371 submission of international application no. PCT/IB2011/054325, filed 3 Oct. 2011, entitled Coordinated 2-Dimensional and 3-Dimensional Graphics Processing, and published in the English language on 12 Jul. 2012 with publication no. WO 2012/093296 A1, which claimed the benefit of the filing date of U.S. application Ser. No. 61/460,574, filed 5 Jan. 2011.

FIELD OF THE INVENTION

This invention relates in general to electronic data processing. More particularly, this invention relates to 2 dimensional and 3 dimensional computer graphics processing.

BACKGROUND TO THE INVENTION

The meanings of certain acronyms and abbreviations used herein are given in Table 1.

TABLE 1

Acronyms and Abbreviations

| | |
|---|---|
| 2-D | 2-dimensional |
| 3-D | 3-dimensional |
| API | Application Programmng Interface |
| COLLADA | Collaborative Design Activity |
| CPU | Central Processing Unit |
| EPG | electronic program guide |
| GPU | Graphics Processing Unit |
| HTML | HyperText Markup Language |
| TIMU | Texture Image Modification Unit |
| XML | Extensible Markup Language |

Wikipedia provides an introduction to 3 dimensional (3 D) computer graphics as follows: 3 D computer graphics (in contrast to 2 dimensional (2 D) computer graphics) are graphics that use a three-dimensional representation of geometric data (often Cartesian) that is stored in the computer for the purposes of performing calculations and rendering 2 D images. Such images may be stored for viewing later or displayed in real-time. Despite these differences, 3 D computer graphics rely on many of the same algorithms as 2 D computer vector graphics in a wire-frame model and 2 D computer raster graphics in the final rendered display. A wire frame model is a visual presentation of a three dimensional or physical object used in 3 D computer graphics. It is created by specifying each edge of the physical object where two mathematically continuous smooth surfaces meet, or by connecting an object's constituent vertices using straight lines or curves. The object is projected onto the computer screen by drawing lines at the location of each edge. In computer graphics software, the distinction between 2 D and 3 D is occasionally blurred; 2 D applications may use 3 D techniques to achieve effects such as lighting, and 3 D may use 2 D rendering techniques. 3 D computer graphics are often referred to as 3 D models. Apart from the rendered graphic, the model is contained within the graphical data file. However, there are differences. A 3 D model is the mathematical representation of any three-dimensional object. A model is not technically a graphic until it is displayed. A model can be displayed visually as a two-dimensional image through a process called 3 D rendering. 3 D rendering is the 3 D computer graphics process of automatically converting 3 D wire frame models into 2 D images with 3 D photorealistic effects on a computer. Moreover, the techniques adapted for efficient handling of 3 D graphics tend to be more computationally intensive than for 2 D graphics, and when implemented in hardware, the complexity and expense is commensurately greater. Nevertheless, modern user interfaces are shifting toward support and expectation of 3 D processing engines.

Some attempts have been made to combine the advantages of the simpler 2 D techniques with 3 D techniques in order to shorten rendering time and generally improve performance with as little hardware as possible.

For example, Jiao et al., U.S. Patent Application Publication No. 2008/0198168 proposes a graphics processing unit that may perform 3 D graphics processing in accordance with a 3 D graphics pipeline to render 3 D images and may also perform 2 D graphics processing in accordance with a 2 D graphics pipeline to render 2 D images. Each stage of the 2 D graphics pipeline may be mapped to at least one stage of the 3 D graphics pipeline. For example, a clipping, masking and scissoring stage in 2 D graphics may be mapped to a depth test stage in 3 D graphics. Coverage values for pixels within paths in 2 D graphics may be determined using rasterization and depth test stages in 3 D graphics. A paint generation stage and an image interpolation stage in 2 D graphics may be mapped to a fragment shader stage in 3 D graphics. A blending stage in 2 D graphics may be mapped to a blending stage in 3 D graphics.

SUMMARY OF THE INVENTION

The present invention, in certain embodiments thereof, seeks to provide an improved graphics processing system, and combines the capabilities of a 3 D and a 2 D user interface, avoiding the cost of a fully designed 3 D application by coordinating 2 D and 3 D authoring tools. For example, 3 D anti-aliased fonts may be achieved by CPU font 2 D-rasterization mapped into a 3 D animated blended texture more efficiently and with much less expenditure of resources than mapping the font text as a pure 3_D graphic by processing large numbers of triangles. Embodiments of the invention optimize hybrid 2 D and 3 D efficiencies by balancing the load between a GPU and a CPU, thereby enabling an application developer to achieve an appropriate tradeoff between rendering performance and resource utilization.

There is provided according to embodiments of the invention a data processing system for graphics processing, including a scene manager having a scene loader for receiving a description of 3 dimensional objects in a scene from a 3-dimensional modelling tool. The description includes first 2-dimensional frame data. The scene manager has a texture image modification unit that is operative for receiving second 2-dimensional frame data from a 2-dimensional rendering engine, and for replacing the first 2-dimensional frame data by the second 2-dimensional frame data. The scene manager has an animation scheduler operative for scheduling and monitoring an animation of the scene. The system includes a display manager operative to invoke the scene manager to render output frame in a display buffer at a selected frequency of operation, and a scene renderer configured for applying the second 2-dimensional frame data to the 3-dimensional objects to produce textured 3-dimensional objects in the display buffer and outputting the textured 3-dimensional objects in the animation.

The system may include a video decoder and a video frame buffer for receiving output from the video decoder, wherein at least a portion of the second 2-dimensional frame data is provided to the texture image modification unit from the video frame buffer.

The system may include a binding controller that receives control signals from an executing computer application via an interface to the computer application. The binding controller recognizes events occurring during operation of the animation scheduler, and is operative to issue instructions to the scene loader and the animation scheduler responsively to the control signals and the events.

According to another aspect of the system, the control signals of the computer application comprise at least one of a first instruction to direct loading of the scene by the scene loader and a second instruction to initiate, discontinue or regulate operation of the animation.

According to an aspect of the system, the scene manager is operative to define generic graphic areas in a rendering buffer and to iterate a 3-dimensional animation by storing new 2-dimensional frame data in the generic graphic areas, and accessing the new 2-dimensional frame data in respective iterations of the 3-dimensional animation.

In an additional aspect of the system, accessing the new 2-dimensional frame data is performed while performing a new iteration of the 3-dimensional animation by locking the scene renderer, thereafter updating the rendering buffer, and after completing updating the rendering buffer unlocking the scene renderer and rendering the 3-dimensional animation.

There is further provided according to embodiments of the invention a device for graphics processing, including a receiver for first image data of a scene including a video stream, a storage unit holding 2 dimensional frame data including the first image data and holding second image data output from a 2-dimensional rendering engine. The storage unit is operative for memorizing a scene description that is output from a 3-dimensional modelling tool. The scene description includes a description of 3 dimensional objects, and further includes first 2-dimensional frame data. The device has a scene manager, including a scene loader operative to access the scene description from the storage unit, a texture image modification unit operative for receiving second 2-dimensional frame data from the 2-dimensional rendering engine, and for replacing the first 2-dimensional frame data by the second 2-dimensional frame data. The scene manager has an animation scheduler operative for scheduling and monitoring an animation of the scene. The device includes a display manager operative to invoke the scene manager to render output frame in a display buffer at a selected frequency of operation and a scene renderer configured for applying the second 2-dimensional frame data to the 3-dimensional objects to produce textured 3-dimensional objects and outputting the textured 3-dimensional objects in the animation.

The device may include a display accepting output of the scene renderer. The receiver, the storage unit, the scene manager and the display manager may be disposed in a common housing as a set-top box adapted to the display.

The device may include a video decoder, and a video frame buffer for receiving output from the video decoder, wherein at least a portion of the 2 dimensional frame data is provided to the texture image modification unit from the video frame buffer.

The device may include a binding controller, configured for receiving control signals from an executing computer application via an interface to the computer application. The binding controller recognizes events occurring during operation of the animation scheduler and is operative to issue instructions to the scene loader and the animation scheduler responsively to the control signals and the events.

The control signals of the computer application may comprise at least one of a first instruction to direct loading of the scene by the scene loader, and a second instruction to initiate, discontinue and regulate operation of the animation.

There is further provided according to embodiments of the invention a method of graphics processing, which is carried out in a first process by applying a 2-dimensional authoring tool to a design, producing first data in a frame buffer from an output of the 2-dimensional authoring tool, the first data including 2-dimensional representations of the design. The method is further carried out in a second process by applying a 3-dimensional authoring tool to the design to produce second data including a scene description of 3-dimensional objects in the design, synchronizing the first process with the second process, combining the first data with the second data by employing the first data to generate respective textures of the 3-dimensional objects of the scene description, generating animations including the textures, and outputting the animations for display thereof.

An aspect of the method includes producing at least a portion of the first data by decoding a video stream.

Yet another aspect of the method includes executing a governing computer application to synchronize the first process with the second process and generate animations.

BRIEF DESCRIPTION OF THE DRAWINGS

For a better understanding of the present invention, reference is made to the de-tailed description of embodiments, by way of example, which is to be read in conjunction with the following drawings, wherein like elements are given like reference numerals, and wherein.

DETAILED DESCRIPTION OF EMBODIMENTS

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Aspects of the present invention may be embodied in software programming code, which is typically maintained in permanent storage, such as a computer readable medium. In a client/server environment, such software programming code may be stored on a client or a server. The software programming code may be embodied on any of a variety of known non-transitory tangible media for use with a data processing system, such as a diskette, hard drive, or CD-ROM. The code may be distributed on such media, or may be distributed to consumers from the memory or storage of one computer system over a network of some type to storage devices on other computer systems for use by consumers of such other systems.

Definitions and Terminology

The term "object" and "objects" may be used herein to indicate representations of actual physical entities in a computer memory or model.

The term "buffer" and "frame buffer" refer to data storage in storage devices such as random access memories and the like. Data read from and written to such buffers and frame buffers are referred to for convenience as "frame buffer input or output" or "frame buffer data" as the case may be.

The teen "texture" may be used herein to refer to the result or product of a texturing process.

The terms "full size texture" and "full size video texture" means that an entire video image is used to texture a face or object. In less than full size textures, only a portion of the image is employed in the texturing process.

System Architecture

Figure 1:
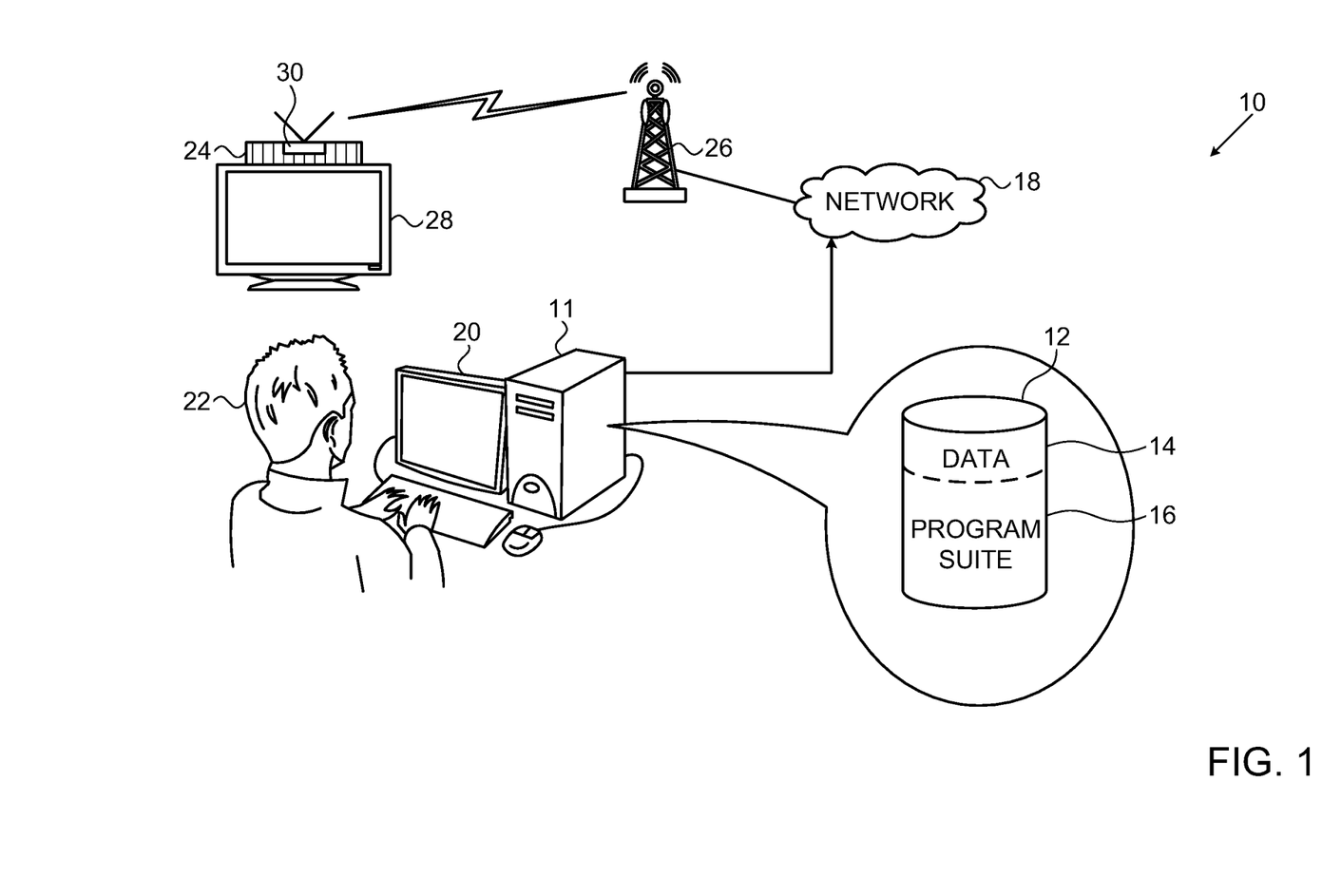
FIG. 1 is a schematic illustration of a system for graphics processing, which is constructed and operative in accordance with a disclosed embodiment of the invention.

Turning now to the drawings, reference is initially made to FIG. 1, which is a schematic illustration of a system 10 for graphics processing, which is constructed and operative in accordance with a disclosed embodiment of the invention.

The system 10 comprises a processor 11 and a memory 12 that stores data objects 14, including a model of the problem being solved. The processor 11 is programmed with a suitable suite of graphics programs 16 for carrying out the functions described hereinbelow. Thus, although portions of the system 10 and embodiments shown in the drawings that follow may be shown as comprising a number of separate functional blocks, these blocks are not necessarily separate physical entities, but rather represent different computing tasks or data objects stored in memory 12 that is accessible to the processor 11. These tasks may be carried out in software running on a single processor, or on multiple processors. The software may be provided to the processor or processors on tangible media, such as CD-ROM or non-volatile memory. Alternatively or additionally, components of the system 10 may comprise a digital signal processor or hard-wired logic.

Although the memory 12 is shown in FIG. 1 as a local data store of the processor 11, the memory 12 may also be maintained at a site remote from the processor 11, for example, on a server or shared disk system (not shown), and may be accessed by the processor 11 via a network 18. In particular, the memory 12 may store the programs 16, which the processor 11 is programmed to access and execute. In many environments the processor 11 is linked to other processors and databases via the network 18. However, this is not essential, and the system 10 may be realized as a stand-alone device.

The system 10 includes a display monitor 20, which presents a user interface for the programs 16, which may be invoked and manipulated by a user 22 to control the generation and processing of graphic images. The results of processing the graphics images may be intermediate data requiring additional processing, which can be delivered to an end user device 24 by any suitable means, for example by wireless transmission from a broadcast station 26 as shown in FIG. 1. The device 24 may be a set-top box adapted to a display 28. It typically contains a receiver 30 for a video stream and/or the products of 2 D and 3 D authoring and display tools as described below. After any needed additional processing in the device 24, the resulting final images may be presented on the display 28. Alternatively, all processing may be accomplished in the processor 11 and the final images can be displayed on the monitor 20, or transmitted elsewhere via the network 18.

The following drawing figures are described for convenience with reference to particular programs and 2 D and 3 D authoring and display tools. It will be understood that other programs and tools having similar functionality may be substituted and appropriately configured using ordinary skill in the art. For example, well-known 2 D authoring tools suitable for use in an authoring system include components of the Adobe® Creative Suite Production Studio, Dreamweaver® and, Illustrator®. Lightwave 3 D®, Cinema 4D™, and 3 Ds Max™ are examples of suitable 3 D authoring tools.

Figure 2:
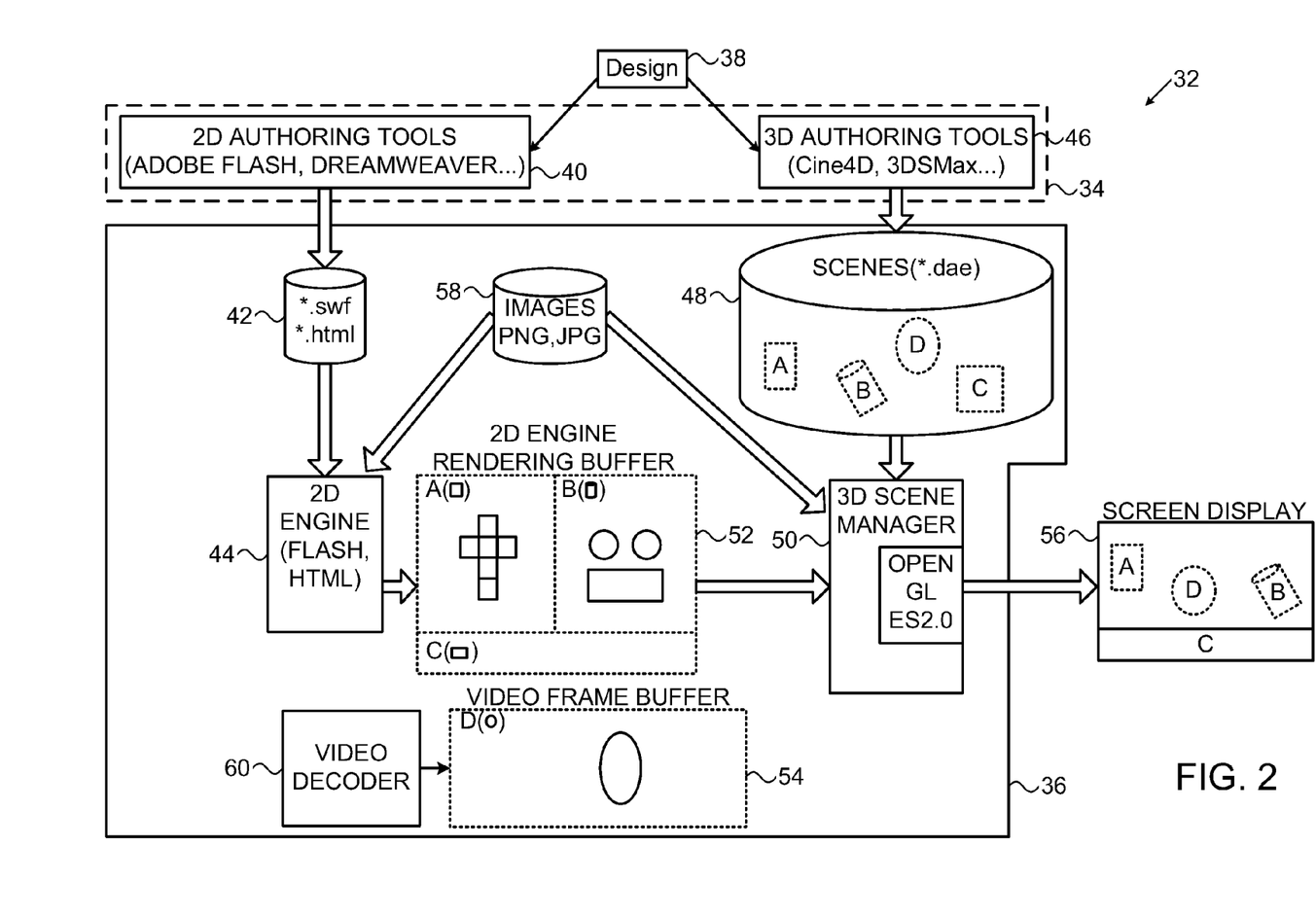
FIG. 2 is a flow diagram illustrating the operation of an authoring system in accordance with an embodiment of the invention.

Reference is now made to FIG. 2, which is a more detailed flow diagram illustrating the operation of an authoring system 32, in accordance with an embodiment of the invention. Steps typically performed by human operators are included in block 34. The data developed by the human operators are stored in an automatic processing unit 36, which can be integrated, e.g., in a set-top box or can be realized as separate components in many combinations. The functions of block 34 and processing unit 36 may be performed at a single site or remote from one another. In large projects a graphics design 38 is typically prepared by a human designer or design team as part of a development process. The design is submitted to a 2 D tool 40, e.g., Adobe Flash, which produces a ".swf" file 42. The .swf file has a proprietary format suitable for multimedia productions generally, and vector graphics in particular. The .swf file undergoes 2 D rendering in a suitable 2 D engine 44, such as Flash Player, as shown in FIG. 2.

Concomitantly the design 38 is submitted to a 3 D modelling tool 46, e.g., Cinema 4D, which produces a Collaborative Design Activity (COLLADA) file, also known as a ".dae" file 48. This is an interchange format adapted for interactive 3 D applications. The COLLADA file describes a 3 D scene, which contains representations of 3 D objects such as: geometries, texture information and animations along a timeline. The scene description in the COLLADA file contains named 3-D objects or elements. While playing the 3 D scene, textures associated with such elements are often replaced in a 3 D scene manager 50 by dynamic textures produced by 2 D rendering or decoded videos buffers. Texturing is accomplished automatically. In one technique, a naming convention designates elements in the 3-dimensional scene for texturing. For example elements having a name beginning with a string such as "App" in the file 48 are textured using content in a 2-dimensional frame buffer 52. Similarly, elements having a name beginning with "Video" are replaced by the content of a video frame buffer 54. These conventions may be elaborated to support more than one application or more than one video stream, e.g., using designations such as "App0", "App1", "Video0", "Video1" to differentiate sources.

The output files of the 2-D tool 40 are first processed by the 2 D engine 44 in a rendering buffer 52, and then, together with the file 48, submitted to be concurrently processed in the 3 D scene manager 50, which synchronizes the two 2 D and the 3 D data. The output of the 3 D scene manager 50 is finally rendered for display on a screen 56, optionally using OpenGL ES2.0 to specify 3-dimensional hardware accelerated rendering. In such a case, the output of the 3 D modelling tool 46 should be OpenGL-compliant. Of course other API's may be chosen instead of OpenGL ES2.0. Cinema4D is currently used as the 3 D modelling tool 46. However, as noted above, other suitable 3 D modelling tools may be used. Addition-ally or alternatively, the authoring system 32 may be modified, mutatis mutandis, so as to be compliant with other conventions, such as DirectX®.

Additionally or alternatively, images 58, such as .png and .jpg files can provide inputs to the 2 D engine 44 and the 3 D scene manager 50. Further additionally or alternatively, a video stream may be captured, decoded by a video decoder 60 and processed in the video frame buffer 54, and submitted to the 3 D scene manager 50 for texturing. Texturing is described below in further detail.

A typical master design, shown in FIG. 2 as the design 38, is a "master Illustrator file", in a format acceptable to the above-mentioned Illustrator program. The master Illustrator file typically contains all the elements needed for the final rendering by the Illustrator program. In particular, the final rendering produced by Illustrator does not have a perspective or 3 D effect, such as overlapping of elements. When the master Illustrator file is processed in two different tools, as shown in FIG. 2, it must meet certain constraints. Thus, in the configuration of FIG. 2, the master design would typically be limited to 2048×2048 pixels, the practical maximum use with current rendering 3-D API's. However, a smaller format is generally preferable, in order to optimize memory management. The position of each element is generally not important because the objects in the Illustrator file will generally be subjected to texturing by the 3 D scene manager 50.

When the master Illustrator file is imported into the 2 D tool 40, the 2-D authoring retains all elements (assets, shape, and text field) in their initial positions. 3 D issues, such as object overlap, are ignored by the 2 D tool 40, as they are handled by the 3 D modelling tool 46.

Figure 3:
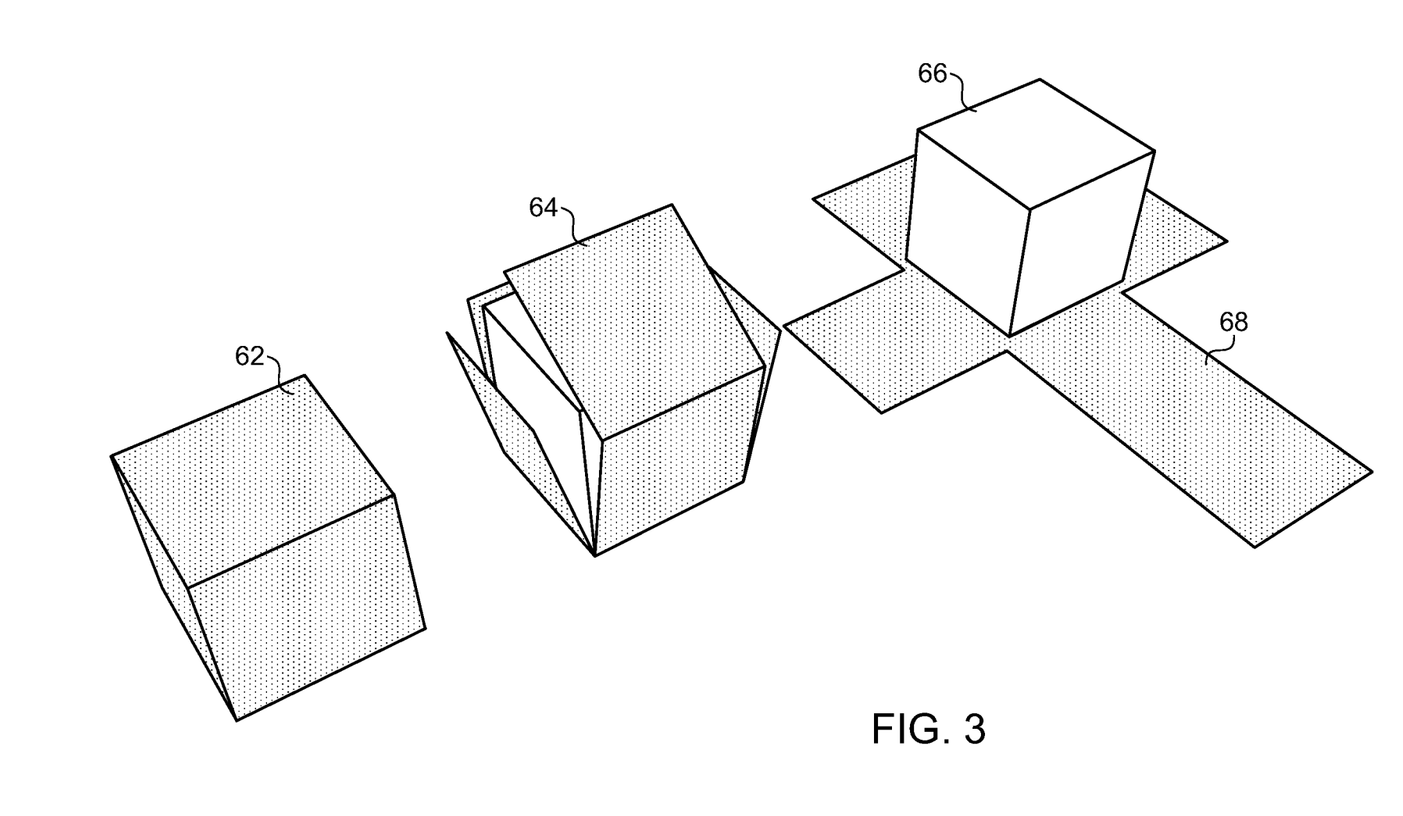
FIG. 3 is a representation of a process of UV mapping of a cube, in accordance with an embodiment of the invention.

UV Mapping is a 3 D modelling process in which a 2 D map represents a 3 D model. Reference is now made to FIG. 3, which is a representation of a process of UV mapping of a cube 62, in accordance with an embodiment of the invention. FIG. 3 shows an intermediate stage 64, and a final stage 66, in which the original surfaces of the cube 62 now appear as flattened areas 68. The areas 68 may be textured as desired. This process is performed in the 3 D modelling tool 46, for example by importing an image file from Illustrator, the designer can create an object to be textured by applying UV mapping to each element of the design 38, including all necessary transition animations.

Texturing of a 2 D graphic, i.e., produced by UV mapping as described above, is accomplished using frame buffers, e.g., the buffer 52 (FIG. 2), and is refreshed constantly by an application, e.g., an HTML widget or a media server such as a Flash hub. At the same time, the result of the texturing is also refreshed by a video decoder, using the video frame buffer 54 (FIG. 2). Many suitable video decoders are known in the art. Indeed, a system, for example a set-top box, may be configured with multiple video decoders, which can operate in parallel.

As noted above, video decoding creates images or frames, which may be reused to populate a 3 D scene animation. For this purpose a video stream may be treated as a succession of static 2 D images displaying motion, which are available to create dynamic textures, which can be used and reused by superimposing them on 3 D objects. Dynamic video textures may be "full size", and applied to one or more objects in a scene. Indeed, many such textures may be combined to create a video mosaic, each element of the mosaic being mapped to a different object by assigning texture coordinates. When applying dynamic textures to 3 D objects, the visual effect may be enhanced by geometrical transformations of the objects, and by hardware-accelerated effects such as animations, scaling, shadowing, and 3 D perspective effects.

Figure 4:
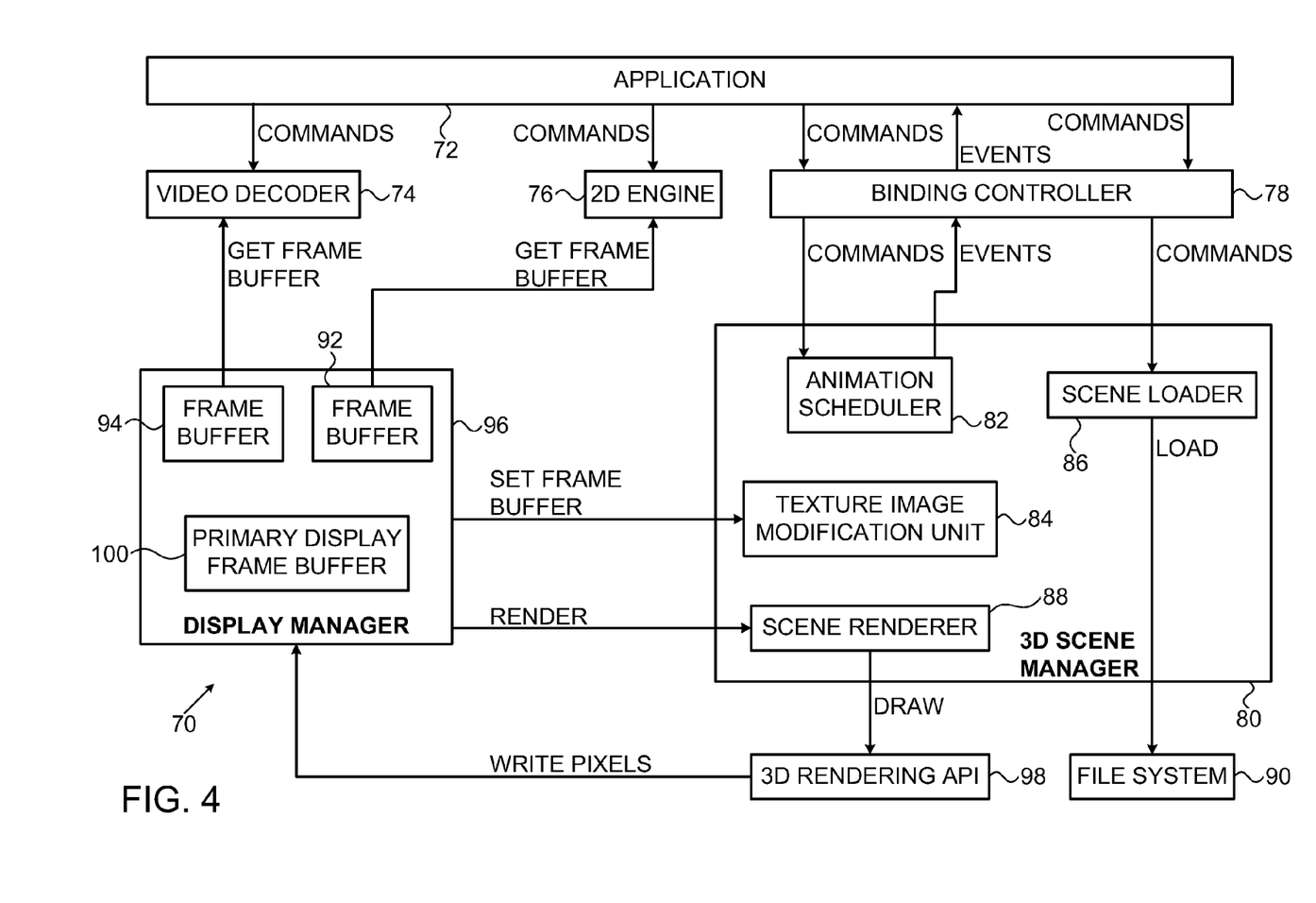
FIG. 4 is a block diagram of a graphics processing system in accordance with an embodiment of the invention.

Reference is now made to FIG. 4, which is a block diagram of a graphics processing system 70, which is constructed and operative in accordance with an embodiment of the invention. The system 70 may comprise a general purpose or embedded computer processor, which is programmed with suitable software for carrying out the functions described hereinbelow.

The system 70 is typically programmed with a governing application 72, which issues commands to a video decoder 74, a 2 D engine 76 and a binding controller 78. It will be understood that although only one instance of the video decoder 74 and 2 D engine 76 is shown, more than one video decoder 74 and 2 D engine 76 may execute and produce frame buffer output according to the scheme described hereinbelow. The application 72 could be written in ActionScript™ or JavaScript™, for example. The binding controller 78 interacts with a 3 D scene manager 80, thereby acting as an intermediary to give visibility and control to the application 72. The 3 D scene manager 80 is responsible for assembling a 3 D composition under control of the application 72. The 3 D scene manager 80 includes the following subcomponents: animation scheduler 82; texture image modification unit 84 (TIMU); scene loader 86; and scene renderer 88. Scene data is stored in a file system 90

Frame buffers 92, 94 of the 2 D engine 76 and the video decoder 74, respectively are accessed by a display manager 96, Data taken from the frame buffers 92, 94 become available to the 3 D scene manager 80, and are processed in the scene renderer 88 to form textured scene animations as explained below. The animations are rendered by the scene renderer 88 and displayed on screen, optionally using an API of a 3 D rendering API 98, such as OpenGL ES2.0.

The 3 D scene manager 80 is responsible to animate the 3 D composition using the frame buffers of the 2 D engine 76 under control of the application 72. To that end, the scene loader 86 loads, reads and parses scene description information. In the current implementation, the scene description is contained in two files: a binary version of the above-noted COLLADA file, and an XML file, defining a list of animations and pointing to data in the COLLADA file. A typical scene description comprises: (1) a static description of all the 3 D elements, such as 3 D meshed objects, including but not limited to position, orientation, illumination, and materials of the objects; and (2) a dynamic description of the animations of the scene, e.g., translation, rotation, and camera path. Once processed by the scene loader 86, the descriptions of the elements and animations become available to other components of the 3 D scene manager 80.

The texture image modification unit 84 is responsible for replacing specific elements in the 3-D scene by designated elements taken from the 2 D frame buffers. For instance, the cube in FIG. 3 is composed of six rectangular faces that can be mapped to some specific zone of the frame buffer 94. Such a zone could have many shapes, e.g., rectangular or triangular.

The scene description provides guidance for the texture image modification unit 84 to associate coordinates of a frame buffer input to a specific 3 D object. As an example, the texture image modification unit 84 could map an entire 2 D frame buffer 92 to a torus object referenced in the scene description and set the video frame buffer 94 as a 3×2 video mosaic to correspond to each of the six faces of a cubic object that might be referenced in the scene description. The association is done via the above noted well-known texture mapping using the relationship: tex(x,y)<=>vert(U,V). Due to the dynamic nature of incoming frame buffers, the texture image modification unit 84 is required to vary the mappings and repeatedly make mapped texture changes available to the scene renderer 88.

The display manager 96 is responsible for calling, at a desired output frequency, the 3-D scene manager 80 to render an output frame in a primary frame buffer 100. In turn, the 3-D scene manager 80 calls the animation scheduler 82, which gets the current time, modifies the 3D scene model accordingly and then calls the scene renderer 88 to actually render the output frame.

In one application, real time effects can be applied to a video stream, for example, colour space conversion of decoded video frames. Most modern video codecs use YUV colour encoding for pixels. The OpenGL library and drivers typically use ARGB colour space. Colour space conversion is efficiently achieved using GL shaders. Moreover, shaders are used to apply real time video effects, such as colour desaturation, and colourization. Shaders support conversion from any colour space to any other colour space.

Another application of multiple input frame buffers is detailed below. Any 2 D engine that produces a frame buffer output can be registered to the texture image modification unit 84 using specific mapping guidance that is detailed in the scene description. For instance, a widget can be implemented using a separate HTML rendering engine and then composed on screen using a Flash electronic program guide application (EPG) for rendering, registering both the HTML engine output and the Flash engine output in the texture image modification unit 84.

The technique is similar for video input: a full size video texture can be used to texture an object, and the same video texture can be used as well to texture multiple objects in the scene. A video mosaic application can be created from a full screen video. Each mosaic cell can be mapped to a different object using texture coordinates. When the graphics system is provided with multiple video decoders, all the decoders are registered with the texture image modification unit 84. Multiple video textures are created by the decoders, respectively, and become available to enrich the user interface to a 3 D scene. Any videos being decoded on the STB can be used as a texture for one or more 3 D objects of the 3 D scene. A full video frame or a portion of it can be used as a texture for 3 D objects, thereby generating an enriched presentation of a video mosaic.

As noted above, animations in a scene are described in the scene description and are parsed, loaded and made available by the scene loader 86. The animation scheduler 82 is operative to organize such animations by scheduling them and monitoring their progress. Timeline identification using named markers facilitates monitoring of the animation. The animation scheduler 82 also deals with animation of 3 D elements of the scene, which, as noted above, are also available from the scene loader 86, and are mapped to textures produced in the texture image modification unit 84. Each defined animation in the scene is independent from the others and can be controlled and monitored separately, using unique identifiers exposed by the animation scheduler 82 to the binding controller 78.

The animation scheduler 82 also exposes monitoring features to the application 72, using an event-based mechanism to notify the binding controller 78 when a specific position in an animation timeline is crossed. The timeline position is referenced in the scene description by named markers referring to time and to particular animations in the scene.

Listing 1 is an XML example of two animation definitions: "intro" and "FS".

Listing 1

```
<?xml version="1.0" encoding="utf-8" ?>
<u:scene xmlns:u="scene_desc">
<markers>
<marker name="BEGIN" position="0.0" />
<marker name="P-1.2" position="1.2" />
<marker name="P-02" position="2.0" />
<marker name="P-END" position="3.0" />
</markers>
< animations>
    <animation name="intro" begin_marker="BEGIN"
    end_marker="P-1.2"
    start_pos_marker="BEGIN" speed="1" loop="false"
    reverse="false" />
    <animation name="FS" begin_marker="P-02"
    end_marker="P-END"
    start_pos_marker="P-02" speed="1" loop="false"
    reverse="false" />
</animations>
</u:scene>
```

The binding controller 78 is the principle interface exposed to the application 72, enabling the application 72 to control the 3 D scene manager 80 and ultimately the rendering of the scene, which is driven by the display manager 96 as described above.

The binding controller 78 exposes the following functions and interfaces to the application 72:

(1) A scene loading interface enables the application 72 to request the 3-D scene manager 80 to load and render a specific scene. The 3-D scene manager 80 can process more than one scene at the same time upon request of the application 72.

(2) An animation control interface enables the application 72 to control a set of animation parameters that are linked to a loaded scene. The set is composed of: a begin marker (name); an end marker (end); a start marker (indicating an initial point of entry into a loop defined by the begin and end markers); a floating point value representing the speed of the animation; a first Boolean value specifying looping behaviour, i.e., a return to the begin marker after the end marker has been reached; and a second Boolean value specifying a form of looping behaviour in which the animation reverses once the end marker has been reached. Setting the speed to 0.0 pauses the animation. Setting the speed to 1.0 plays the animation at the speed specified in the scene definition. Setting the speed to 2.0 plays the animation 2 times faster than speed specified in the scene definition. The animation control interface enables the application 72 to load a list of the animation names defined by a scene and a set of animation parameters that can be associated to with scene. The animation control interface also enables the application 72 to set any portion of the set of animation parameters in one operation.

(3) As noted above, the application 72 is able to control the display presentation made by the 3-D scene manager 80. An animation monitoring interface enables the application 72 to be notified via the binding controller 78 when named markers are encountered during scene rendering. The application 80 directly commands the 2-D engine 76, which, in and of itself, would be insufficient to achieve 3 D effects on screen. However, by commanding the 3-D scene manager 80 (via the binding controller 78), 3-D effects are achieved. The 3-D effects may involve mixtures of video and graphics when the application 72 controls the video decoder 74 and the 2-D engine 76 in a coordinated manner.

Awareness of the progress of an animation playback enables the application 72 to chain animations or to preload resources. It is the overall responsibility of the logic in the application 72 to maintain coherency between a 2 D graphic state and 3 D animation state of a scene. Using above-described mechanisms, the application 72 initiates animations in the Scene and is notified upon completion of each animation. From the perspective of the application 72, it is required to set the initial 2 D graphic state required by an animation before starting the 3 D animation and to ensure that the animation is over before progressing to another 2 D graphic state. The scene loading interface, animation control interface, and animation monitoring interface of the binding controller 78 may be made available to multiple concurrently executing instances of the application 72. Thus, animations may be controlled independently by the instances.

The display manager 96 is responsible for registration of all the 2 D flat frame buffers originating from the 2 D engine 76 and the video decoder 74 and delivered to the 3 D scene manager 80. As noted above, the display manager 96 also maintains the primary frame buffer 100 that is finally rendered by the 3-D scene manager 80 and displayed on screen. The 3-D scene data are maintained in storage in the file system 90 and used by the scene loader 86 upon request by the application 72 via the binding controller 78.

The display manager 96 receives output frame buffers from all running 2 D rendering engines and video decoders in many pixel formats and sizes. Whenever it needs to generate a frame, the display manager 96 updates the texture image modification unit 84 as needed with new versions of the frame buffers 92, 94, and then calls the scene renderer 88, which generates the frame in the primary frame buffer 100 using the 3-D rendering API 98. The combined 2 D and 3 D data are stored in the primary frame buffer 100.

Figure 5:
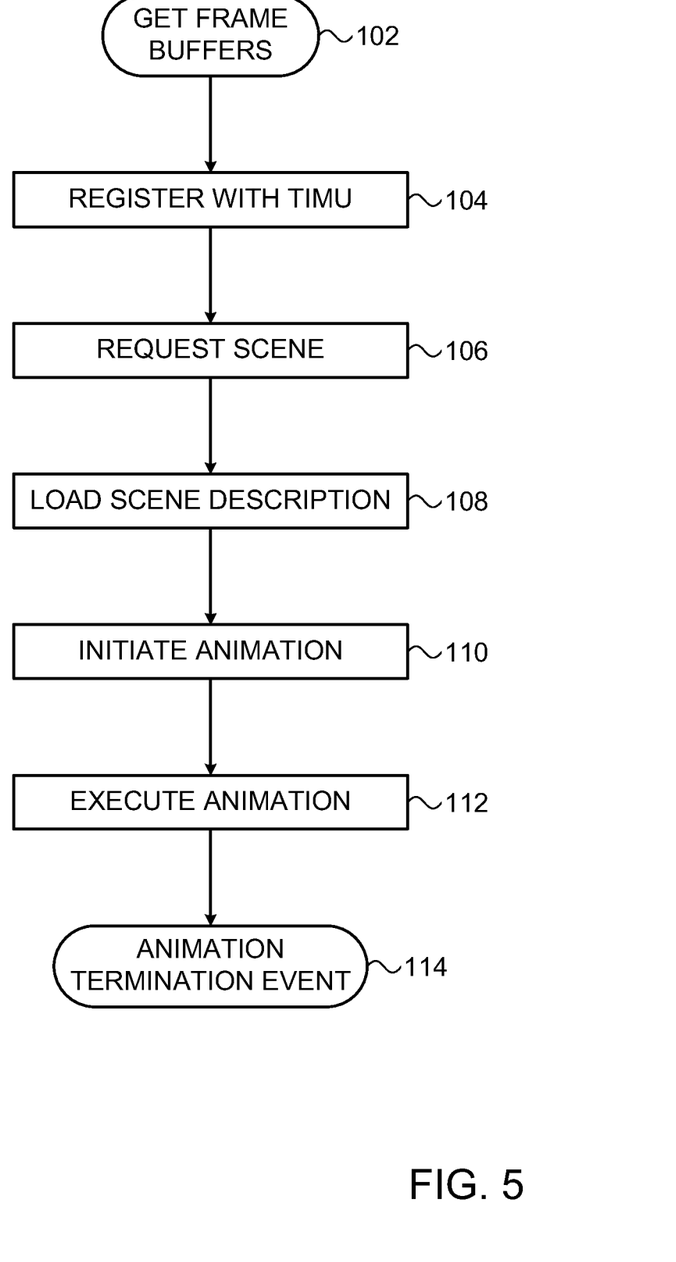
FIG. 5 is a flow chart of a typical interaction sequence in a graphics processing system according to an embodiment of the invention.

Reference is now made to FIG. 5, which is a flow chart of a typical interaction sequence in a graphics processing system according to an embodiment of the invention. For convenience, the process steps are shown with reference to the configuration shown in FIG. 4. However, this is by way of example and not of limitation.

At initial step 102, the display manager 96 obtains frame buffer 92 and/or frame buffer 94 from the video decoder 74 and 2 D engine 76.

Next, at step 104, the display manager 96 updates the frame buffer 92 and frame buffer 94 with the texture image modification unit 84.

Next, at step 106 a request to load a scene description is issued by the application 72. It will be recalled that scene descriptions may be obtained from COLLADA files. The request is issued to the binding controller 78, using the scene loading interface.

Next, at step 108, responsively to the request in step 106, a scene description file is loaded by the scene loader 86.

Next at step 110, the binding controller 78 initiates an animation of the scene using the animation control interface. An event notification registration is associated with the end marker of the animation.

Next, at step 112, upon request of the display manager 96, the scene renderer 88 draws each animation frame and render the final 3 D composition of the animated scene to the primary frame buffer 100, which it will be recalled, is managed by the display manager 96.

At final step 114, the animation scheduler 82 signals an animation termination event to the binding controller 78, which thereupon notifies the binding controller 78 that the end marker of the animation has been reached. The application 72 may then respond according to its animation control logic.

Figures 6, 6A:
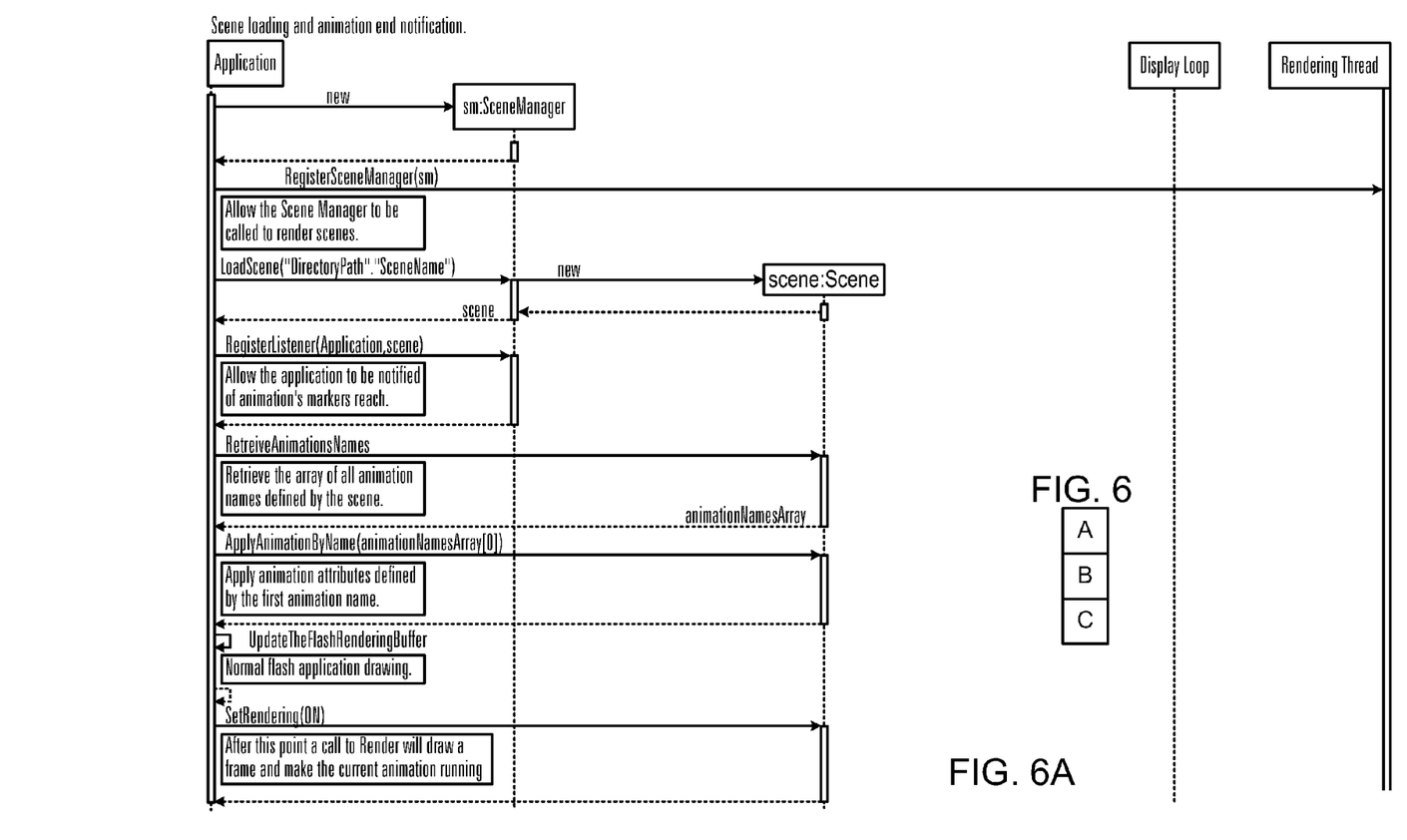
FIGS. 6A, 6B and 6C, collectively referred to as FIG. 6, are an event diagram showing a sequence of operations in a graphics processing system in accordance with an embodiment of the invention.
Figure 6B:
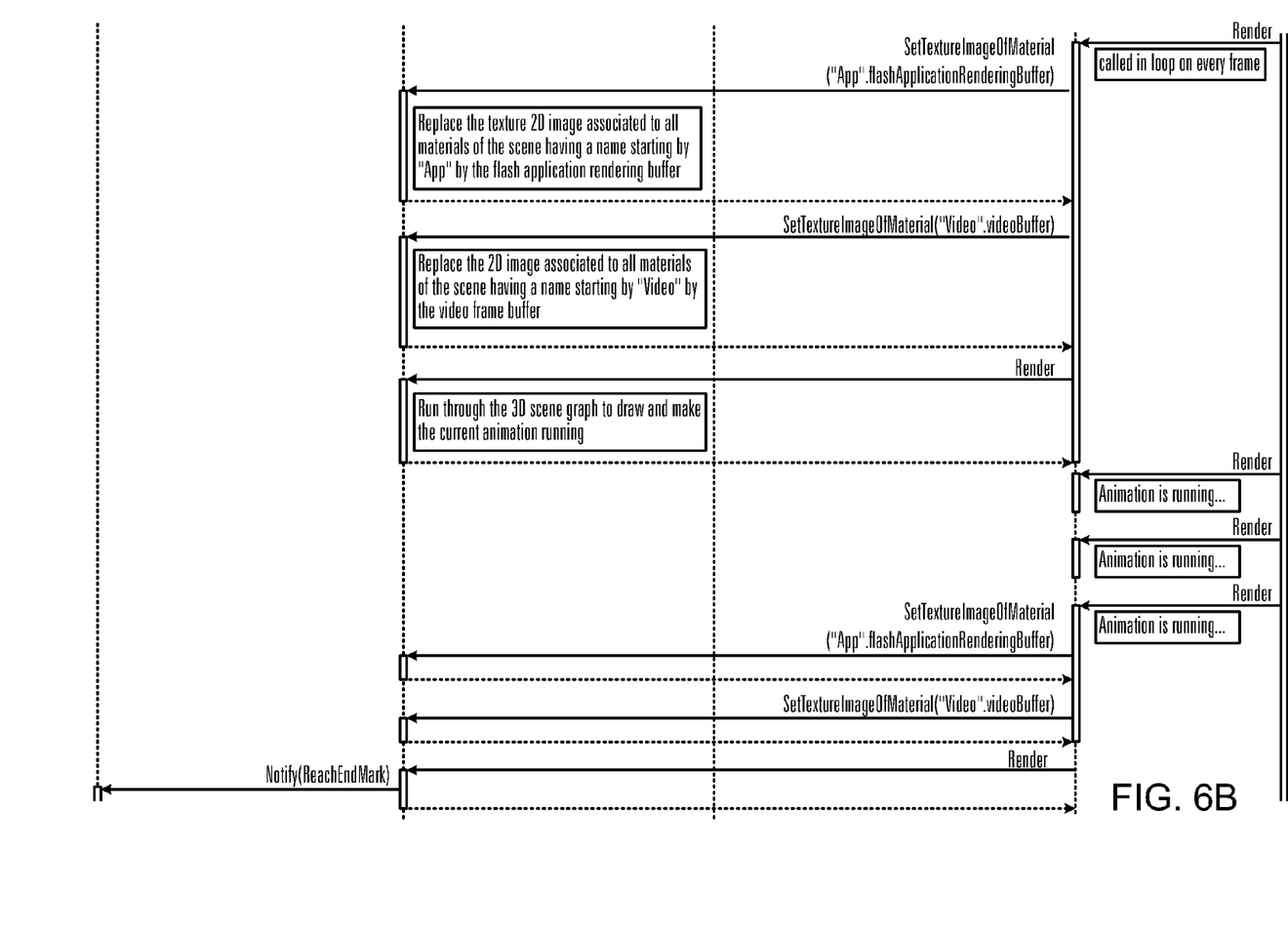
Figure 6C:
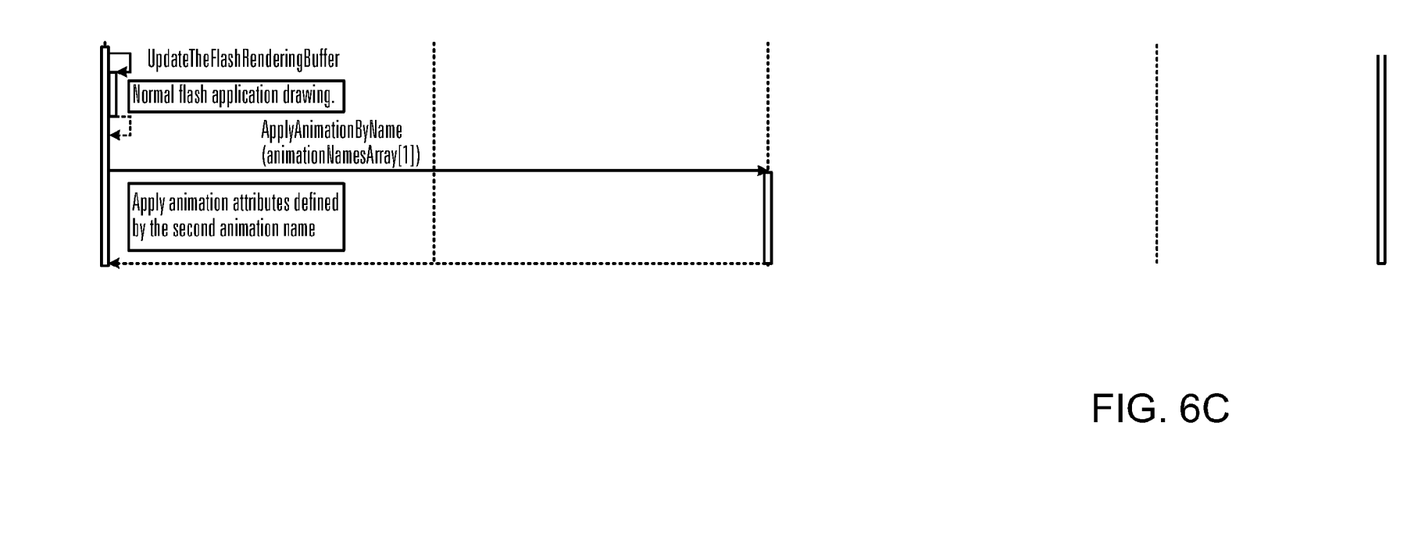

FIG. 6 is a sequence diagram showing a sequence of coordinated texturing and rendering operations in accordance with an embodiment of the invention as described above.

Reverting to FIG. 4, the discussion above implies that the 3 D scene manager 80 may be required to reference several specific areas of the 2-D frame buffer 92, and to use many 3-D animations. To minimize the number of the 3-D animations, recognition that two or more animations are visually equivalent can be exploited.

Figure 7:
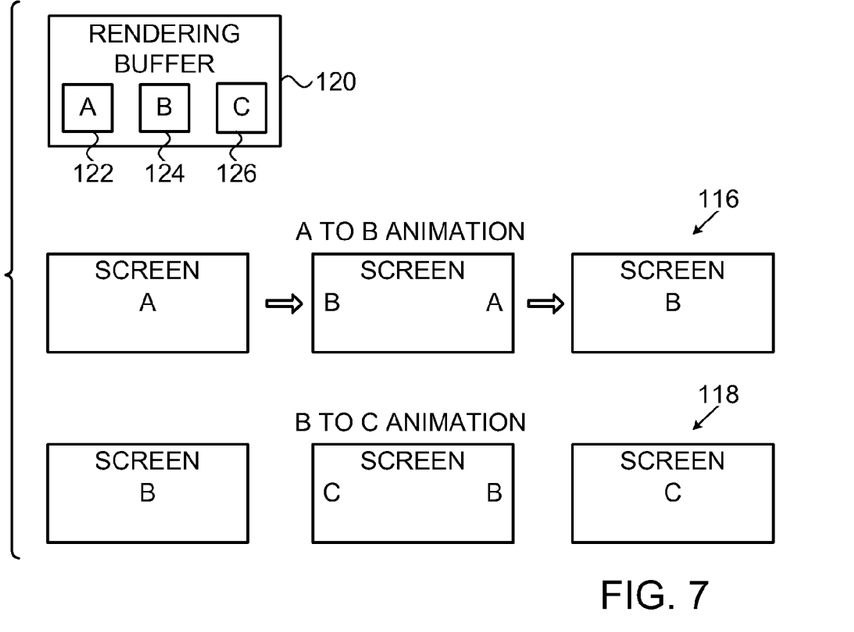
FIG. 7 is a set of diagrams illustrating a technique for minimization of a number of 3-D animations in accordance with an embodiment of the invention.

Reference is now made to FIG. 7, which are diagrams illustrating a technique for minimization of the number of 3-D animations in accordance with an embodiment of the invention. Assume that it is desired to perform two animations. Animation 116 is a transition from Screen A to Screen B (A-to-B animation), with an intermediate screen as shown. Animation 118 is a succeeding animation from Screen B to Screen C (B-to-C animation), again with an intermediate screen shown. Rendering buffer 120 contains respective 2-D texturing data A 122, B 124, C 126 to be selectively applied during the animations 116, 118 to the screens A, B, C. It is often possible to cover more than one animation, e.g., animations 116, 118 by applying different sets of 2-D data to a single set of 3-D data.

Figure 8:
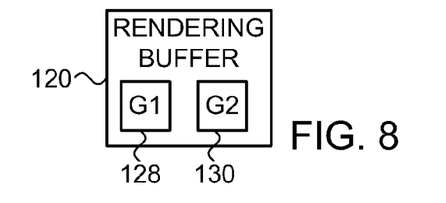
FIG. 8 is a diagram of a redefined 2-D rendering buffer used in the performance of the technique shown in FIG. 6.

Reference is now made to FIG. 8, which is a diagram of a redefined 2-D rendering buffer used in the performance of the technique shown in FIG. 7, in accordance with an embodiment of the invention. One can define generic graphic areas G1 128, G2 130 within the buffer 120. These generic areas may be referenced by the 3-D animation and a corresponding generic 3-D animation, referred to in this example as a "G1-to-G2 animation".

Figure 9:
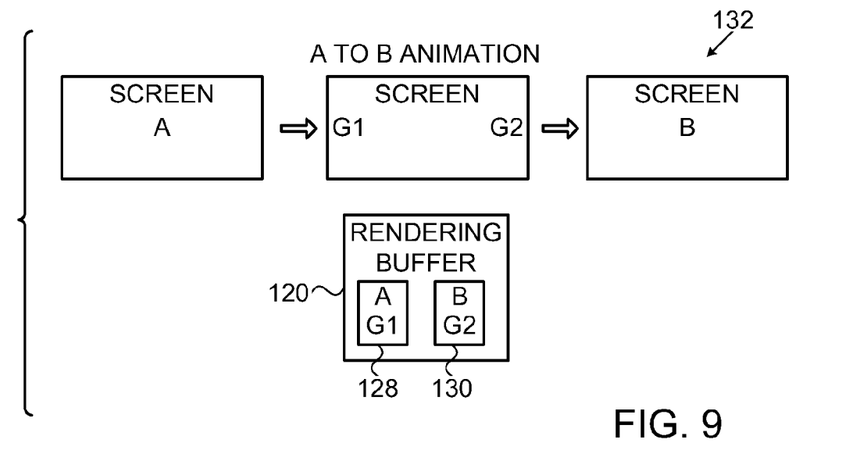
FIG. 9 illustrates a process of performing an animation using the technique shown in FIG. 7, in accordance with an embodiment of the invention.

Reference is now made to FIG. 9, which illustrates a process of performing the A-to-B animation (FIG. 7), in accordance with an embodiment of the invention. To perform the A-to-B animation, the application places data A in the area G1 128 of the buffer 120 and B in area G2 130 and launches G1 to G2 animation 132.

Figure 10:
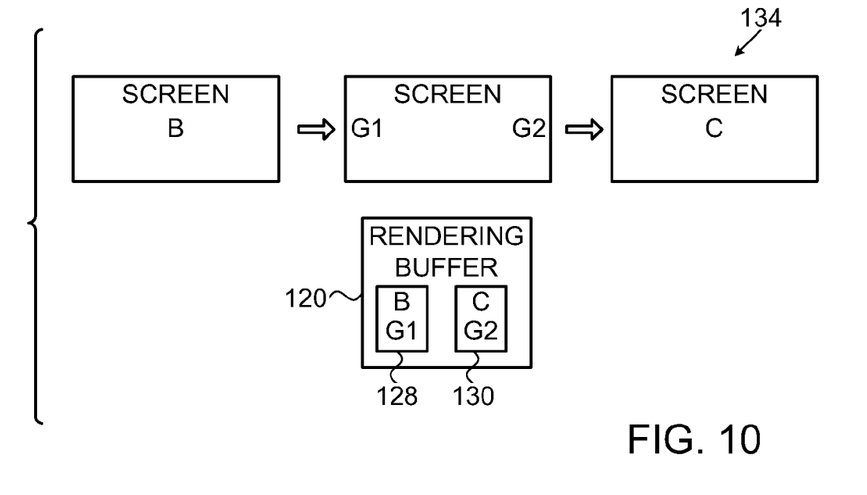
FIG. 10 illustrates performance another animation using the technique shown in FIG. 7, in accordance with an embodiment of the invention.

Reference is now made to FIG. 10, which illustrates performance of the B-to-C animation (FIG. 7), in accordance with an embodiment of the invention. The application places data B in area G1 128 and data C in area G2 130, and again launches another instance of G1-to-G2 animation, referenced as animation 134.

Figure 11:
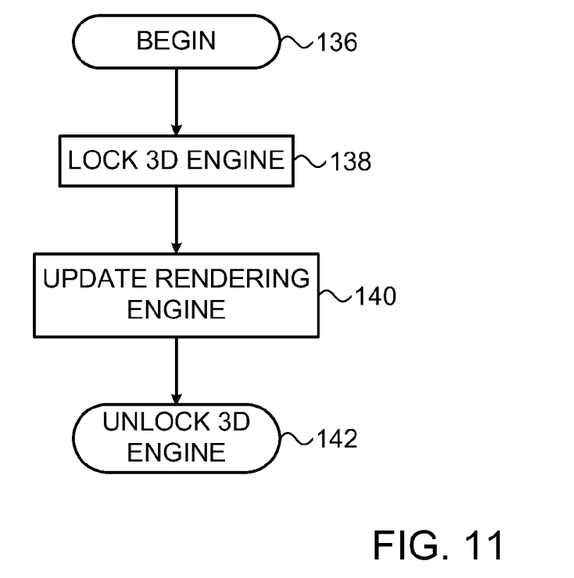
FIG. 11 is a flow chart of a method of synchronizing an application and a 3-D rendering engine in accordance with an embodiment of the invention.

One difficulty with the procedures shown in FIG. 9 and FIG. 10 is the possibility that graphic artefacts may appear if the application causes data to be placed in the buffer 120 without coordination with the 3-D engine that performs the actual animation. This may occur, for example, if area G1 128 needs to be updated from data A to data B following performance of a first instance of the G1-to-G2 animation. If this update has not been completed before the start of a subsequent instance of the G1-to-G2 animation, then various artefacts may appear on the display screen during playback. This problem is obviated by introducing a locking mechanism that synchronizes the application and the 3-D engine. Reference is now made to FIG. 11, which is a flow chart of a method of synchronizing an application and a 3-D rendering engine in accordance with an embodiment of the invention.

At initial step 136 it is determined that a new instance of the G1-to-G2 animation is to be performed. Next, at step 138, the 3-D rendering engine is locked. The frame resulting from the first instance of the G1-to-G2 animation continues to be displayed.

Next, at step 140, the buffer 120 is updated as described above with reference to FIG. 9 and FIG. 10.

Then at final step 142 the 3-D rendering engine is unlocked and allowed to proceed with the new instance of the G1-to-G2 animation, which is then displayed on the screen.

An advantage of the method shown in FIG. 11 is that the memory used within the buffer 120 is minimized. Since the areas G1 128, G2 130 are simply overwritten, it is not necessary to maintain separate copies of data, such as data A and data B in the buffer 120.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A data processing system for graphics processing, comprising:
a scene manager implemented in a hardware processor, and comprising:
a scene loader operative to receive a scene description obtained after processing a design in a 3-dimensional authoring tool, the scene description comprising: a description of 3 dimensional objects in the scene, first 2-dimensional frame data for the 3-dimensional objects; and guidance information for replacing the first 2-dimensional frame data;
a texture image modification unit, operative to receive second 2-dimensional frame data rendered in a 2-dimensional frame buffer by a 2-dimensional rendering engine, the second 2-dimensional frame data being obtained after processing a design in a 2-dimensional authoring tool, and to replace the first 2-dimensional frame data by the second 2-dimensional frame data by associating coordinates of the second 2-dimensional frame data in the frame buffer to the 3-dimensional objects according to the guidance information; and
an animation scheduler operative to schedule and monitor an animation of the scene;
a display manager operative to invoke the scene manager to render output frames in a display buffer at a selected frequency of operation; and
a scene renderer configured for automatically applying the second 2-dimensional frame data to the 3-dimensional objects to produce textured 3-dimensional objects in the display buffer and outputting the textured 3-dimensional objects in the animation, wherein the scene manager is operative to define generic graphic areas in a rendering buffer and to iterate a 3-dimensional animation by storing new 2-dimensional frame data in the generic graphic areas, and accessing the new 2-dimensional frame data in respective iterations of the 3-dimensional animation.

2. The system according to claim 1, further comprising:
a video decoder; and
a video frame buffer, receiving output from the video decoder, wherein at least a portion of the second 2-dimensional frame data is provided to the texture image modification unit from the video frame buffer.

3. The system according to claim 1, further comprising a binding controller, receiving control signals from an executing computer application via an interface to the computer application, the binding controller recognizing events occurring during operation of the animation scheduler and operative to issue instructions to the scene loader and the animation scheduler responsively to the control signals and the events.

4. The system according to claim 3, wherein the control signals of the computer application comprise at least one of a first instruction to direct loading of the scene by the scene loader and a second instruction to initiate, discontinue or regulate operation of the animation.

5. The system according to claim 1, wherein the accessing of the new 2-dimensional frame data comprises the steps of:
while performing a new iteration of the 3-dimensional animation:
locking the scene renderer;
thereafter updating the rendering buffer;
after completing the step of updating the rendering buffer unlocking the scene renderer; and
rendering the 3-dimensional animation.

6. A device for graphics processing, comprising:
a receiver for first image data of a scene comprising a video stream;
a storage unit holding 2 dimensional frame data comprising the first image data and further comprising second image data output from a 2-dimensional rendering engine, the second image data being obtained after processing a design in a 2-dimensional authoring tool, the storage unit further operative to memorize a scene description being obtained after processing the design in a 3-dimensional authoring tool, the scene description comprising: a description of 3 dimensional objects in the scene; first 2-dimensional frame data for the 3-dimensional objects; and guidance information for replacing the first 2-dimensional frame data;
a scene manager implemented in a hardware processor, and comprising:
a scene loader operative to access the scene description from the storage unit;
a texture image modification unit, operative to receive second 2-dimensional frame data from the storage unit, and to replace the first 2-dimensional frame data by the second 2-dimensional frame data by associating coordinates of the second 2-dimensional frame data in the storage unit to the 3-dimensional objects according to the guidance information;
an animation scheduler operative to schedule and monitor an animation of the scene;
a display manager operative to invoke the scene manager to render output frame in a display buffer at a selected frequency of operation; and
a scene renderer configured for automatically applying the second 2-dimensional frame data to the 3-dimensional objects to produce textured 3-dimensional objects and outputting the textured 3-dimensional objects in the animation, wherein the scene manager is operative to define generic graphic areas in a rendering buffer and to iterate a 3-dimensional animation by storing new 2-dimensional frame data in the generic graphic areas, and accessing the new 2-dimensional frame data in respective iterations of the 3-dimensional animation.

7. The device according to claim 6, wherein further comprising a display accepting output of the scene renderer, and wherein the receiver, the storage unit, the scene manager and the display manager are disposed in a common housing as a set-top box adapted to the display.

8. The device according to claim 6, further comprising:
a video decoder; and
a video frame buffer, receiving output from the video decoder, wherein at least a portion of the 2 dimensional frame data is provided to the texture image modification unit from the video frame buffer.

9. The device according to claim 6, further comprising a binding controller, receiving control signals from an executing computer application via an interface to the computer application, the binding controller recognizing events occurring during operation of the animation scheduler and operative to issue instructions to the scene loader and the animation scheduler responsively to the control signals and the events.

10. The device according to claim 9, wherein the control signals of the computer application comprise at least one of a first instruction to direct loading of the scene by the scene loader, and a second instruction to initiate, discontinue and regulate operation of the animation.

11. The device according to claim 6, wherein the accessing of the new 2-dimensional frame data comprises the steps of:
while performing a new iteration of the 3-dimensional animation:
locking the scene renderer;
thereafter updating the rendering buffer; and
after completing the step of updating the rendering buffer unlocking the scene renderer; and
rendering the 3-dimensional animation.

12. A method of graphics processing, comprising the steps of:
in a first process applying a 2-dimensional authoring tool to a design;
producing first data in a frame buffer from an output of the 2-dimensional authoring tool, the first data comprising 2-dimensional representations of the design;
in a second process applying a 3-dimensional authoring tool to the design to produce second data comprising a scene description of 3-dimensional objects in the design;
synchronizing the first process with the second process;
combining the first data with the second data by employing the first data to generate respective textures of the 3-dimensional objects of the scene description;
generating animations comprising the textures; and
outputting the animations for display thereof, wherein generating animations comprises:
defining generic graphic areas in a rendering buffer;
iterating a 3-dimensional animation by storing new 2-dimensional frame data in the generic graphic areas; and
accessing the new 2-dimensional frame data in respective iterations of the 3-dimensional animation.

13. The method according to claim 12, further comprising producing at least a portion of the first data by decoding a video stream.

14. The method according to claim 12, further comprising the step of executing a governing computer application to control the steps of synchronizing the first process with the second process and generating animations.

15. The method according to claim 12, wherein the accessing of the new 2-dimensional frame data is performed with a scene renderer and comprises the steps of:
while performing a new iteration of the 3-dimensional animation:
locking the scene renderer;
thereafter updating the rendering buffer;
after completing the step of updating the rendering buffer unlocking the scene renderer; and
rendering the 3-dimensional animation.

* * * * *